United States Patent
Funahashi et al.

[11] Patent Number: 6,078,010
[45] Date of Patent: *Jun. 20, 2000

[54] INNER CABLE FOR PUSH-PULL CONTROL CABLE

[75] Inventors: Nobuhiro Funahashi; Hiroaki Furukawa, both of Takarazuka, Japan

[73] Assignee: Nippon Cable System Inc., Hyogo-Ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/938,936

[22] Filed: Oct. 2, 1997

[30] Foreign Application Priority Data

Oct. 3, 1996 [JP] Japan .................................. 8-263012

[51] Int. Cl.$^7$ .................. H01B 5/00; H01B 5/08
[52] U.S. Cl. .................... 174/126.1; 174/128.1
[58] Field of Search .............. 174/128.1, 128.2, 174/126.1, 126.2, 106 R, 36

[56] References Cited

U.S. PATENT DOCUMENTS

| | | | |
|---|---|---|---|
| 2,211,790 | 8/1940 | Pile | 174/501 |
| 2,519,812 | 8/1950 | Arens | 174/501 |
| 3,183,301 | 5/1965 | Kompanek, Jr. et al. | 174/108 |
| 4,411,168 | 10/1983 | Yoshifuji | 174/501 R |

*Primary Examiner*—Kristine Kincaid
*Assistant Examiner*—William H. Mayo, III
*Attorney, Agent, or Firm*—Antonelli, Terry, Stout & Kraus, LLP

[57] ABSTRACT

A inner cable for push-pull control cable includes a core and N pieces of strands spirally wound around the core, wherein a diameter of the core is larger than a diameter of the each of the N pieces of strands, wherein the N pieces of strands includes M piece(s) thereof wherein each diameter of M piece(s) of the N pieces of strands is larger than each diameter the remaining of (N-M) pieces of strands of the N pieces of strands, and wherein N and M are integers satisfying the following relation of $1 \leq M \leq 0.3N$, and $N \geq 4$.

11 Claims, 10 Drawing Sheets

INNER CABLE FOR PUSH-PULL CONTROL CABLE

BACKGROUND OF THE INVENTION

The present invention relates to an inner cable. More particularly to an inner cable composed of a core and N pieces of strands wound around the core, characterized in that in each diameter of M (1≦M≦0.3N) piece(s) of strands of the N pieces of strands is larger than that of remaining (N-M) pieces of strands, where the above-mentioned N≧4 and M are integers.

Conventionally, previous inner cables being used as push-pull control cables have been configured to comprise a core b and a plurality of strands c spirally wound around the core b. For example, as disclosed in FIGS. 3(a) and 3(b) which denote prior art, the core b is composed of a single wire or stranded wires that have a diameter which is identical to each other.

Further, as an inner cable for control cable, there has been such a geared cable composed of a core and a -strand having relatively large diameter, the strand being spirally wound around the core in such a manner as not to contact with each other.

Figure 4A:
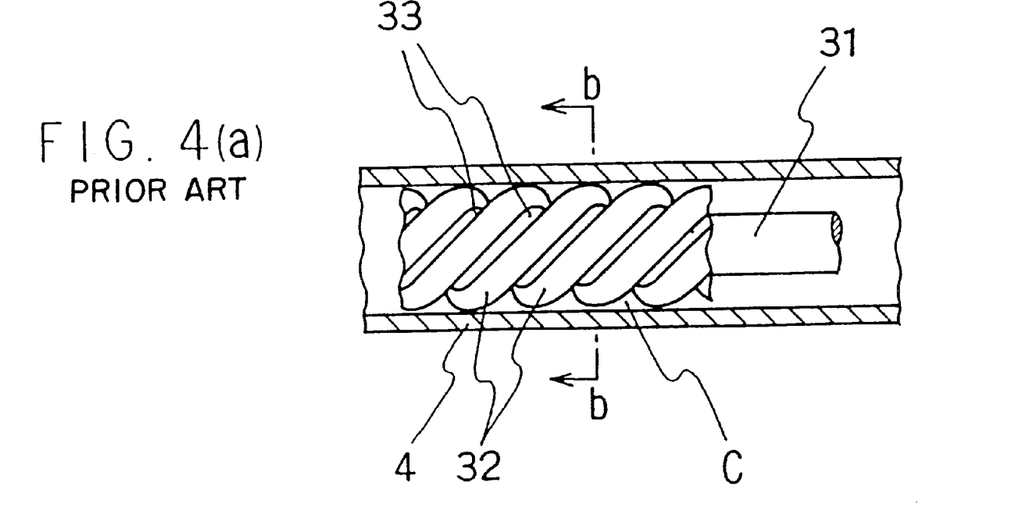
FIGS. 4(A) & 4(B) are explanatory views showing another example of a conventional inner cable.
Figure 4B:
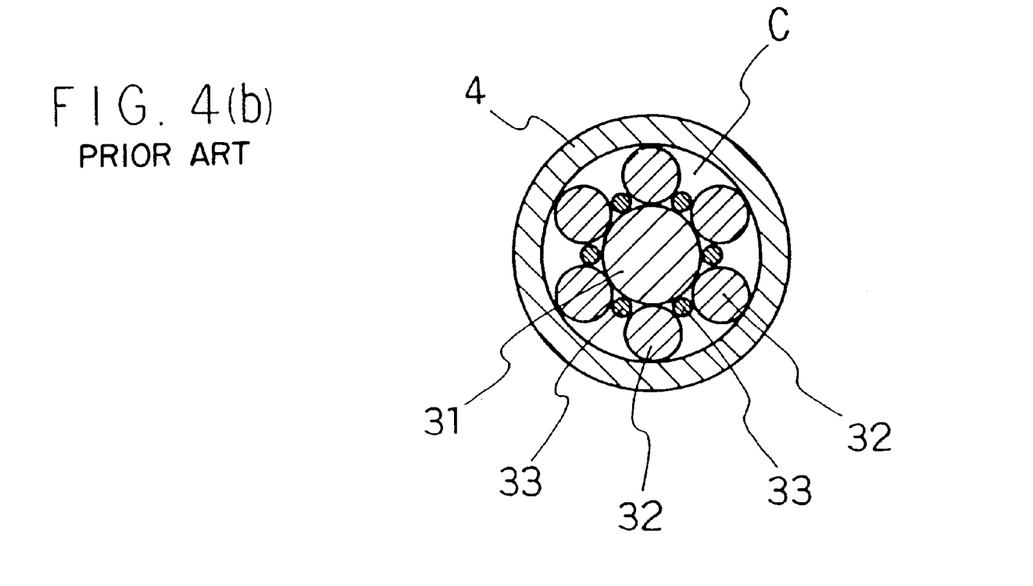

In Japanese Examined Utility Model Publication No. 35787/1985, as shown in FIGS. 4(a) and 4(b), there is disclosed an inner cable for push-pull control cable, the inner cable being composed of a core 31 composed of a single wire or stranded wires, a plurality of main strands 32 spirally wound around the core 31 in such a manner that the plurality of strands 32 are not contacted with each other, and each of the strands 32 is evenly spaced with each other, and a plurality of secondary strands 33 arranged between the above-mentioned main strands, in which diameter of each of the main strands is larger than that of each of the secondary strands.

Figure 5A:
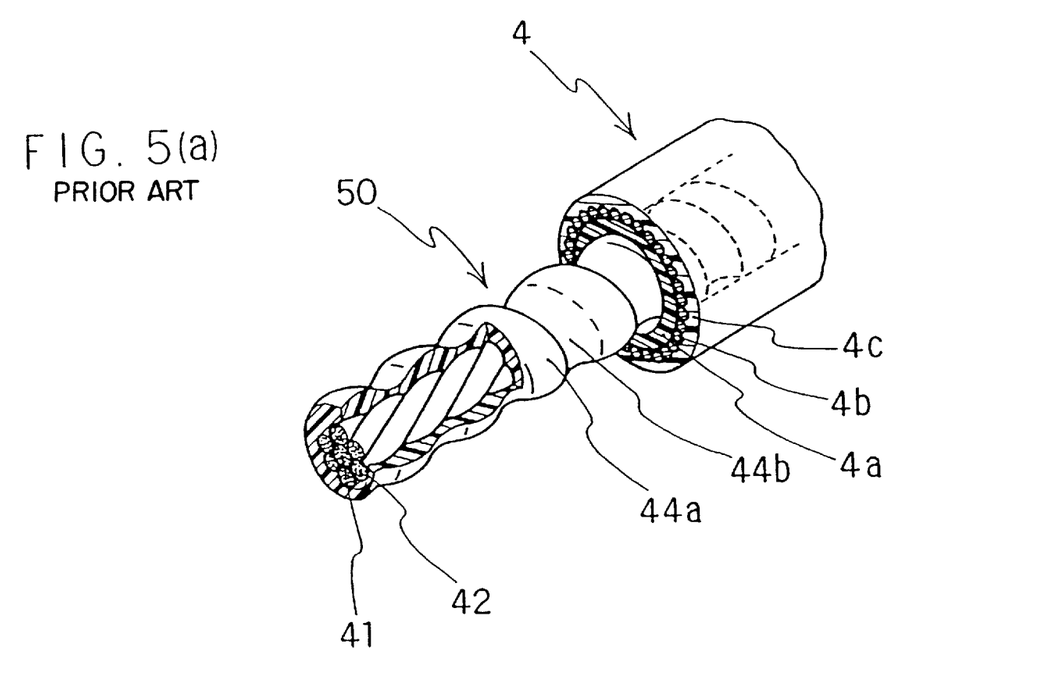
FIGS. 5(A) & 5(B) are explanatory views showing still another example of a conventional inner cable.
Figure 5B:
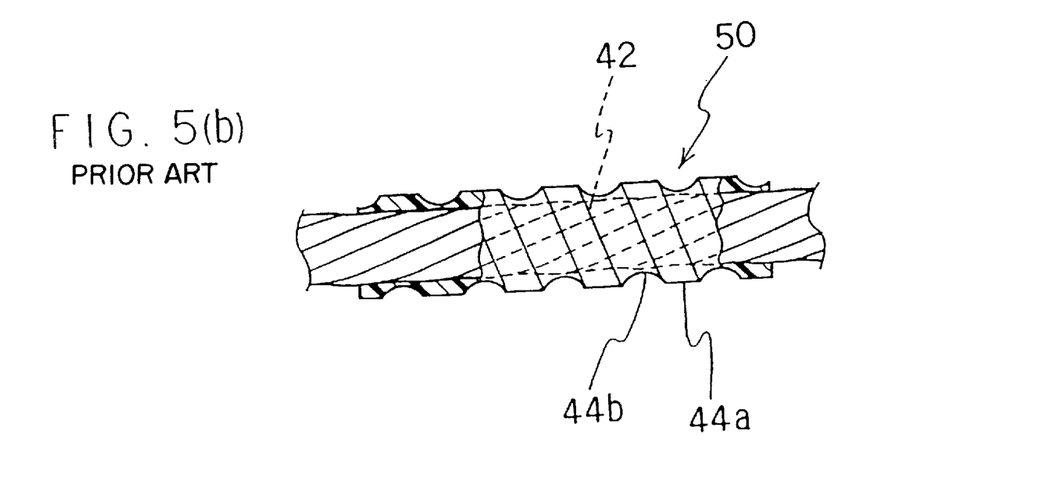

In Japanese Examined Utility Model Publication No. 11380/1988, as shown in FIGS. 5(a) and 5(b), there is disclosed an inner cable for push-pull control cable, the inner cable being composed of a core 41 and a plurality of strands 42 spirally wound around the core 41, each strand 42 being composed of a plurality of wires stranded with each other, e.g., wound together to form the strand 42. On the plurality of wires, there is formed a covering layer 44 made of synthetic resin, the covering layer 44 including a thick portion 44a and a thin portion 44b.

In Japanese Unexamined Patent Publication No. 26640/1995, there is disclosed a push-pull control cable including: an inner cable 52 composed of a core 53 made of a single steel wire extending straight and having a resilient property, and a plurality of strands wound around the core 53, each of the strands being composed of a plurality of wires; and a conduit, into which the inner cable 52 being inserted.

Conventionally, as a problem to be solved in the push-pull control cable there is generated a noise during an operation of the push-pull control cable or at the time of finishing the operation thereof.

In order to solve the above-mentioned problem, there is such a method as to reduce clearance between outer surface of the inner wire and inner surface of the conduit.

However, in the method there is a problem to deteriorate essential performance of the control cable if the clearance is to be reduced because load efficiency is lowered and sliding resistance with no load is increased.

Figure 3A:
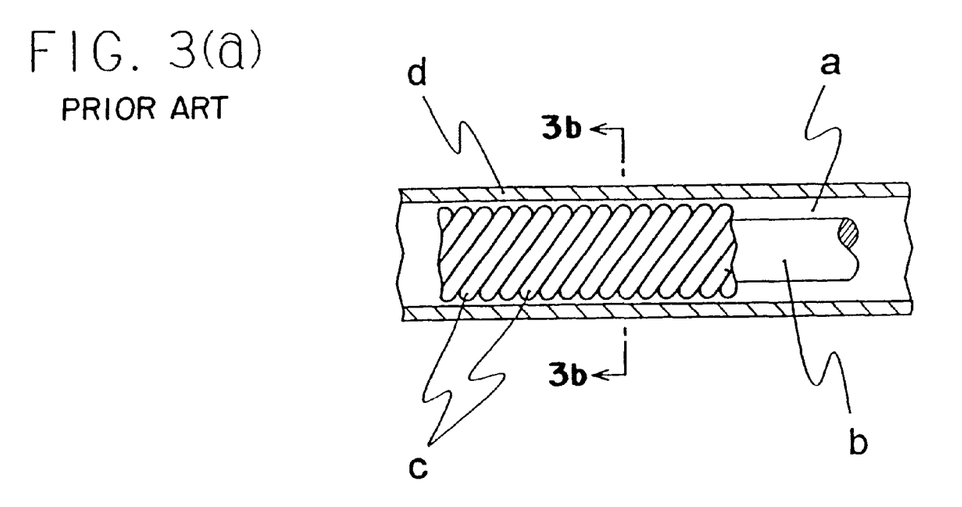
FIGS. 3(A) & 3(B) are explanatory views showing an example of a conventional inner cable.
Figure 3B:
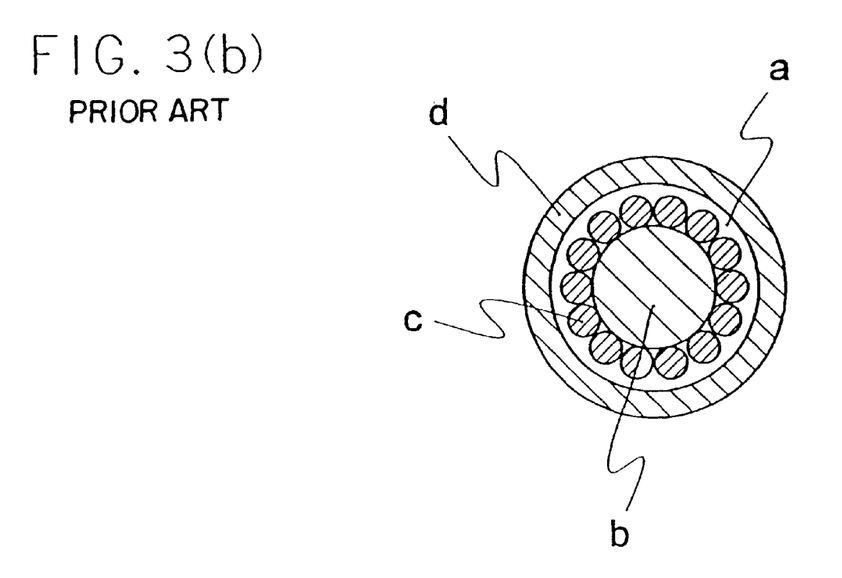
Figure 6:
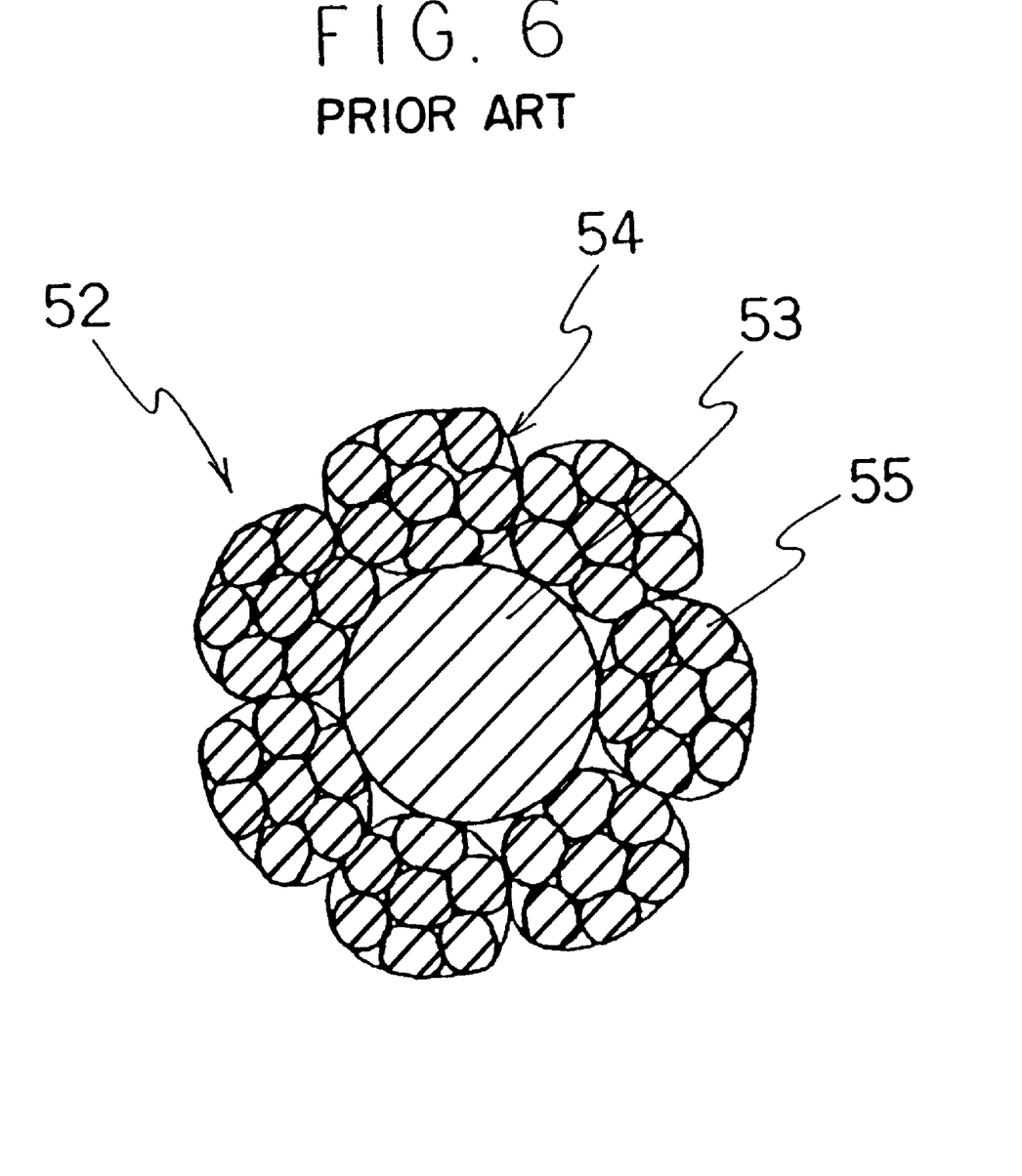
FIG. 6 is an explanatory view showing yet another example of a conventional inner cable.

Comparing with the prior art of FIGS. 3(a) and 3(b), clearance in the prior art of FIGS. 4(a) and 4(b) is large. In the prior art of FIGS. 5(a) and 5(b), coefficient of friction is small since the surfaces to be slided on both ides of the conduit and the inner cable are made of synthetic resin. In the prior art of FIG. 6, there is employed a strand construction wherein each strand is composed of a plurality of wires. Therefore, when the clearance is small, decreasing of the load efficiency is small, but the load efficiency cannot be satisfactory.

The object of the present invention is to provide an inner cable in which the load efficiency is not lowered, the sliding resistance with no load is not increased, and any noise is not generated in the operation of the push-pull control cable.

SUMMARY OF THE INVENTION

A inner cable for push-pull control cable of the present invention comprises a core and N pieces of strands, where N is an integer ≧4, spirally wound together in one layer around said core, wherein a diameter of said core is larger than a diameter of each of N pieces of strands, wherein each diameter of at least one M piece of strands N is larger than each diameter of (N-M) pieces of strands of N pieces of strands, and wherein M is an integer satisfying the following relation:

$$1 \leq M \leq 0.3N.$$

It is preferable that M is 1.

Preferably, a difference between a maximum finished diameter of the inner cable defined by the M piece(s) of the strands and a minimum finished diameter of the inner cable defined by the remaining (N-M) pieces of strands is in a range of 2 to 10% of the minimum finished diameter.

Preferably, each of N pieces of strands is composed of a plurality of wires stranded with each other.

Preferably, N is in a range of 7 to 10.

DETAILED DESCRIPTION

Figure 1:
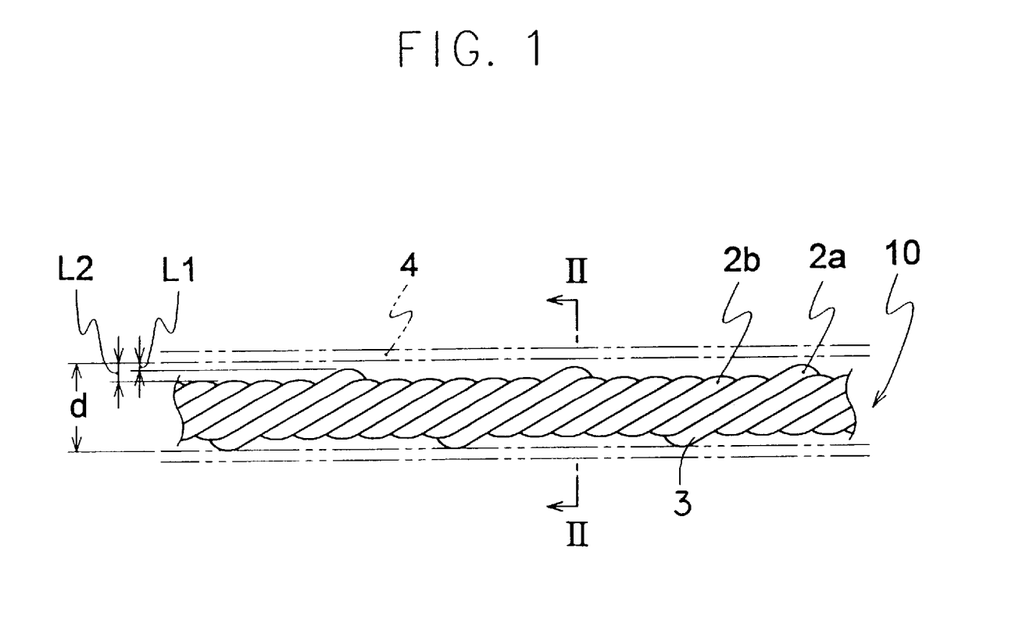
FIG. 1 is an explanatory view showing an embodiment of inner cable of the present invention.
Figure 2:
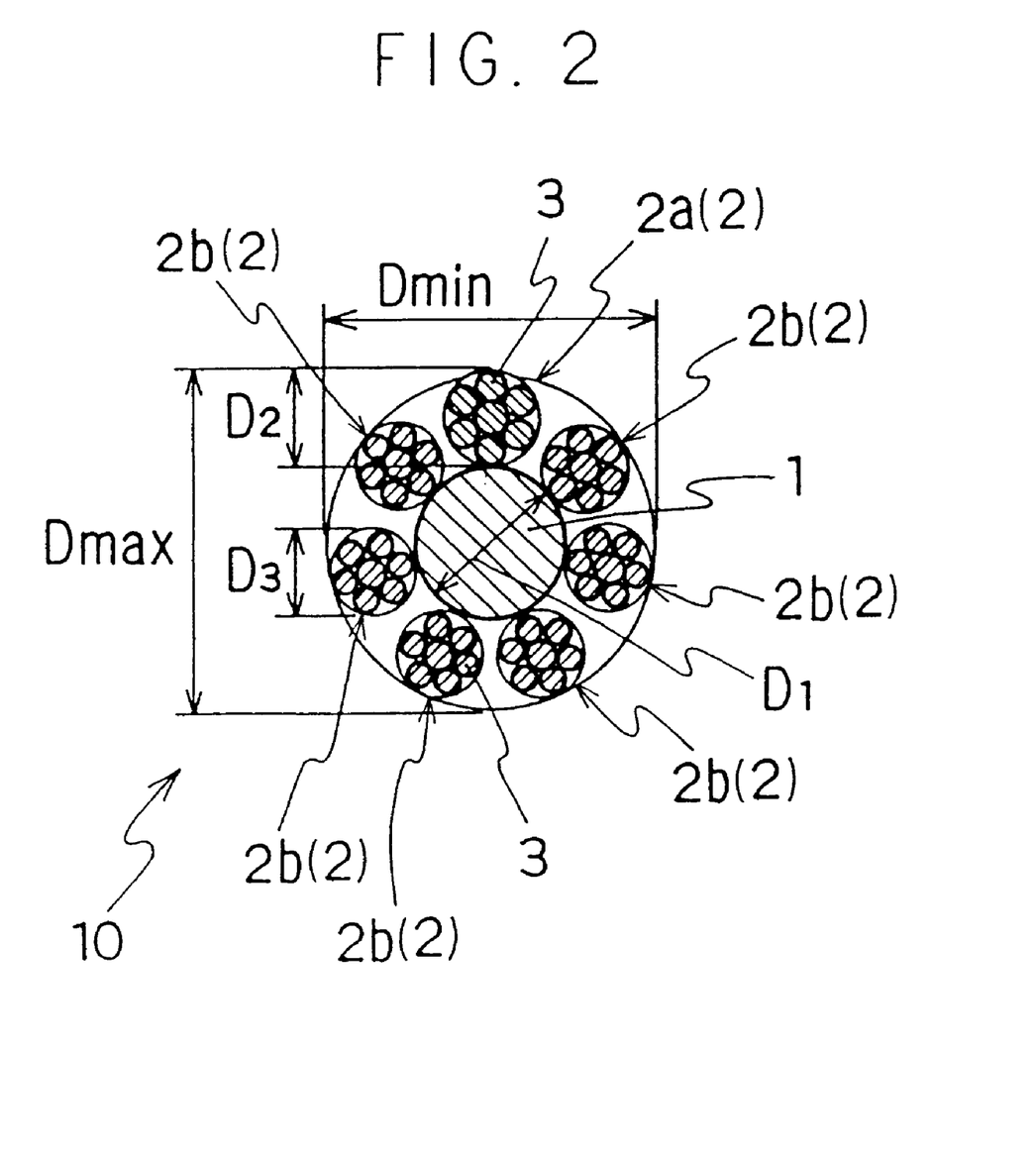
FIG. 2 is a cross sectional view taken on line II—II of FIG. 1.

With reference to the drawings, FIGS. 1 and 2 depict an inner cable 10 for push-pull control cable (hereinafter referred to as inner cable) of the present invention.

More particularly, FIG. 1 is an explanatory view showing an embodiment of inner cable of the present invention wherein the inner cable 10 is composed of a core 1 (FIG. 2) and N pieces of strands 2 spirally wound together in one layer around said core 1. Each diameter of M piece(s) of strands 2a is larger than each diameter of (N-M) pieces of strands 2b of N pieces of strands 2. N and M are integers satisfying the following relation:

$1 \leq M \leq 0.3N$, and $N \geq 4$

Each of the strands 2a, 2b is composed of a plurality of wires 3 stranded with each other.

As a number N of pieces of the strands 2, any integer satisfying the relation of $N \geq 4$ can be employed, and not restricted to a particular number. In this embodiment, as a number of pieces of strands 2, any integer which is in a range of 7 to 10 is preferably employed. Further, number of pieces of wires 3 constituting the strands 2 is not restricted to particular number (integer) of pieces, 7 is preferably employed in this embodiment.

As a number of pieces of strands 2a, any integer satisfying the relation of $1 \leq M \leq 0.3N$ can be employed, 1 is most preferable.

In this embodiment, diameter $D_1$ of the core 1 is 1.60 mm, diameter $D_2$ of the strand 2a is 1.05 mm, and diameter $D_3$ of the strands 2b is 0.95 mm.

Therefore, in the inner cable of this embodiment, maximum finished diameter $D_{max}$ is 3.6 mm, and minimum finished diamter $D_{min}$ is 3.5 mm.

Inner cable 10 of this embodiment can be preferably applied to not only the conduit shown in FIGS. 3 to 5, but also any other conduits.

Minimum clearance L1 (i.e. $(d-D_{max})$) between inner diameter d of the conduit 4 and the inner cable 10 is in a range of about 0.05 to about 0.15 mm. Therefore, the minimum clearance L1 of the present invention is one half of that of prior art. On the other hand, maximum clearance L2 (i.e. $(d-D_{min})$) between inner diameter d of the conduit 4 and the inner cable 10 is in a range of about 0.15 to about 0.25 mm.

As material for the core 1, SWO-A or SWO-B specified in JIS G 3560 can be preferably employed. As material for the wire 3 constituting the strands 2, zinc plated wire of SWRH-62A specified in JIS G 3506 can be preferably employed.

The inner cable of Examples 1 and 2 of the present invention will be explained comparing with comparative Examples 1 to 3.

EXAMPLE 1

As the core 1, a piece of wire of SWO-A specified in JIS G 3560 having a diameter of 1.6 mm was used. As M piece(s) of strand(s) 2a, a piece of strand 2a (i.e. M=1) composed of seven pieces of zinc plated steel wires 3 were used. As (N-M) pieces of strands 2b, six (i.e. N=7, M=1) pieces of strands 2b each composed of core wire 3 having diameter of 0.35 mm and six wires 3 having diameter of 0.30 mm wound around the core wire 3 were used. Thus obtained seven pieces of strands 2 including a piece of strand 2a and six pieces of strands 2b were wound around the core 1 in such a manner as to have an ordinary lay construction. As will be understood by the skilled artisan, a cable having an "ordinary lay" is one in which the wires of the individual strands are laid in one direction, and the strands in the cable are laid in the opposite direction. As a result, the inner cable 10 shown in FIG. 2 was obtained. As a conduit 4, such a conduit as to have a liner made of polytetrafluoroethylene was prepared. Then, after applying silicone grease to outer surface of the inner cable 10, the inner cable 10 was inserted into the conduit 4.

In this embodiment, $((D_{max}-D_{min})/D_{min}) \times 100 = 2.9\%$

EXAMPLE 2

As the core 1, a piece of wire of SWO-A specified in JIS G 3560 having a diameter of 1.6 mm was used. As M pieces of strand 2a, two pieces of strands 2a (i.e. M=2) composed of seven pieces of zinc plated steel wires 3 were used. As (N-M) pieces of strands 2b, five (i.e. N=7, M=2) pieces of strands 2b each composed of core wire 3 having diameter of 0.35 mm and six wires 3 having diameter of 0.30 mm wound around the core wire 3 were used. Thus obtained seven pieces of strands 2 including two pieces of strands 2a and five pieces of strands 2b were wound around the core 1 in such a manner as to have an ordinary lay construction. As a result, the inner cable 10 shown in FIG. 2 was obtained. As a conduit 4, such a conduit as to have a liner made of polytetrafluoroethylene was prepared. Then, after applying silicone grease to outer surface of the inner cable 10, the inner cable 10 was inserted into the conduit 4.

Also in this embodiment, $((D_{max}-D_{min})/D_{min}) \times 100 = 2.9\%$.

Comparative Example 1

As a core 53, a piece of wire of SWO-A specified in JIS G 3560 having a diameter of 1.6 mm was used. As strands 54, seven pieces of strands 54 each composed of seven zinc plated steel wires 55, and each stranded with each other were used. Thus obtained seven pieces of strands 54 were wound around the core 53 in such a manner as to have a ordinary lay construction. Thereafter, thus constructed inner cable was subjected to swaging treatment. As a result, the inner cable 52 shown in FIG. 6 was obtained. Diameter of the inner cable was 3.5 mm. As a conduit, the conduit which is the same as the conduit used in Example 1 or 2 was employed.

Comparative Example 2

As comparative Example 2, the inner cable mentioned in prior art 3 was used. Further, also in this case, the conduit 4 used in Example 1 or 2 was employed.

Comparative Example 3

As comparative Example 3, the inner cable mentioned in prior art 4 was used. Further, also in this case, the conduit 4 used in Example 1 or 2 was employed.

The clearance between the conduit and the inner cable in each of the test pieces is shown in Table 1.

Figures 9A, 9B:
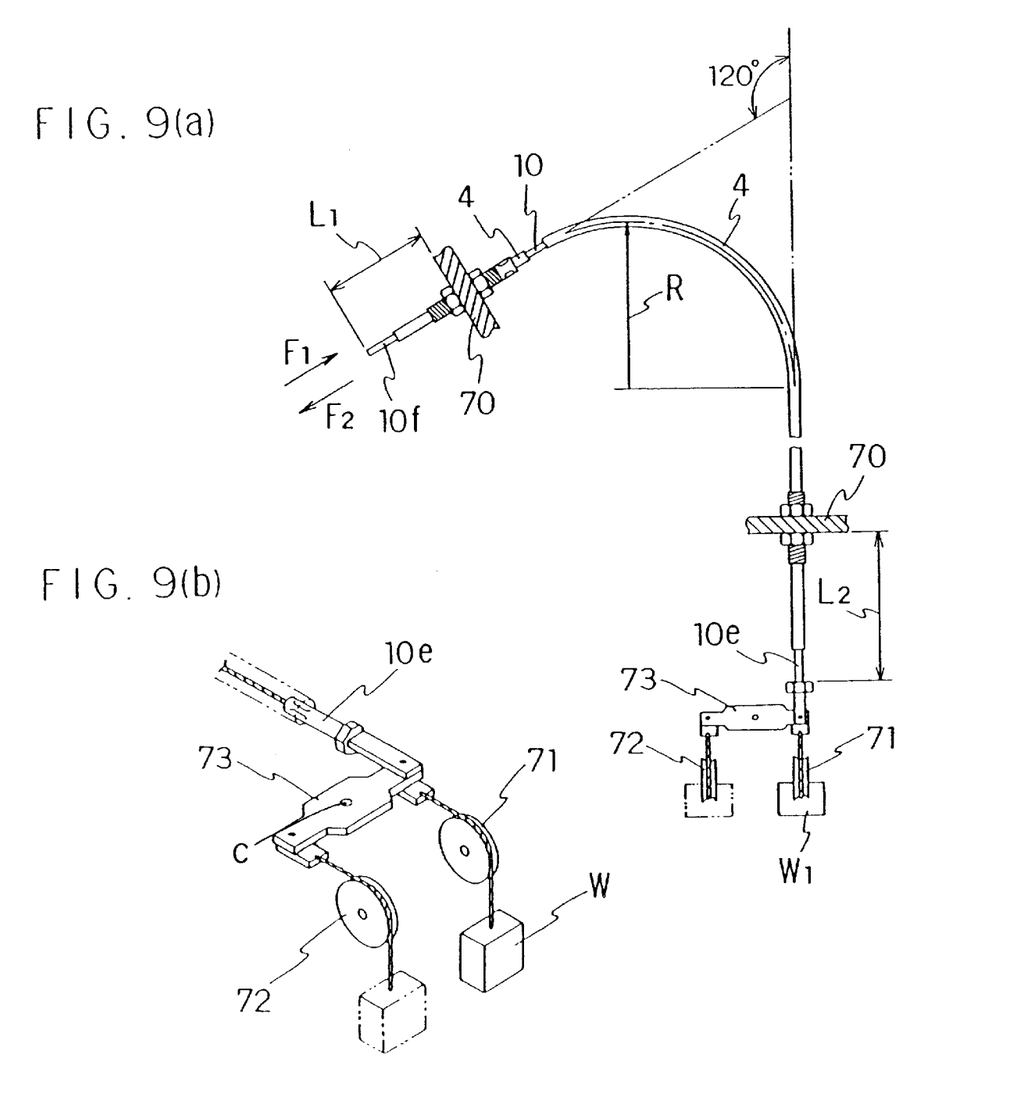
FIGS. 9(A) & 9(B) explanatory view of measuring apparatus.

Load efficiency, backlash and noise were measured in the inner cables in Examples 1 to 2 and comparative Examples 1 to 3. Load efficiency and backlash were measured by using apparatus shown in FIG. 9a, in which control cable (4, 10) was fixed to a table 70, the conduit 4 of the control cable having length of 963 mm, and the control cable being bent in such a manner that radius R was 170 mm, and tangential line on one end of the control cable is inclined at 120 degree with respect to another tangential line on the other end of the control cable. At one end 10e of the inner cable 10, reference load W is connected via pulleys 71, 72 and lever 73. At the other end 10f of the inner cable 10, the apparatus for measuring push/pull force was connected. In order to measure the load efficiency, load of push and pull force of 300N were applied to the end 10e of the inner cable 10 respectively, the other end 10f was subjected to push/pull operation by a push-pull gauge. As a result, push-pull operation force (F1) and pull operation force (F2) were obtained. The load W was applied to the end 10e of the inner cable by weight via pulley 71. In the case of push operation as shown in FIG. 9b, and the load W (push force) was applied to the end 10e of the inner cable by changing the direction of the load by weight using a pulley 72 and a pivotable lever 73 which is rotated around center point C, one end of which is connected to the weight, and the other end of which is connected to the inner cable. The data described in Table 1 are mean values of the measured values in the test that were undergone three times by using five test pieces after subjecting push operations and pull operations respectively about ten times. Force transmission efficiency p (%) was obtained by the following relation:

η=(load (W)/operation force (F))×100 (%)

Result of the measurement is shown in Table 1.

The measurement of backlash was undergone by fixing the end 10f of the inner cable 10 to the table 70, subjecting to the other end 10e of the inner cable 10 via pulleys 71, 72 to operation force of 50N, and measuring the displacement of the inner cable 10.

The backlash is defined as a relation of ($L_{22}$-$L_{21}$) under the condition where the end 10f of the inner cable 10 is fixed at the center portion $L_1$ of the operation stroke, then $L_2$ is measured (measured value is $L_{21}$), and load of 50N is applied to the other end of 10e of the inner cable 10, and $L_2$ is measured (measured value is $L_{22}$), the measurement of the backlash is performed by using vernier calipers. Further, each of five samples was subjected to measurement of the backlash three times, and each mean value of the measurment is shown in Table 1.

Figure 7:
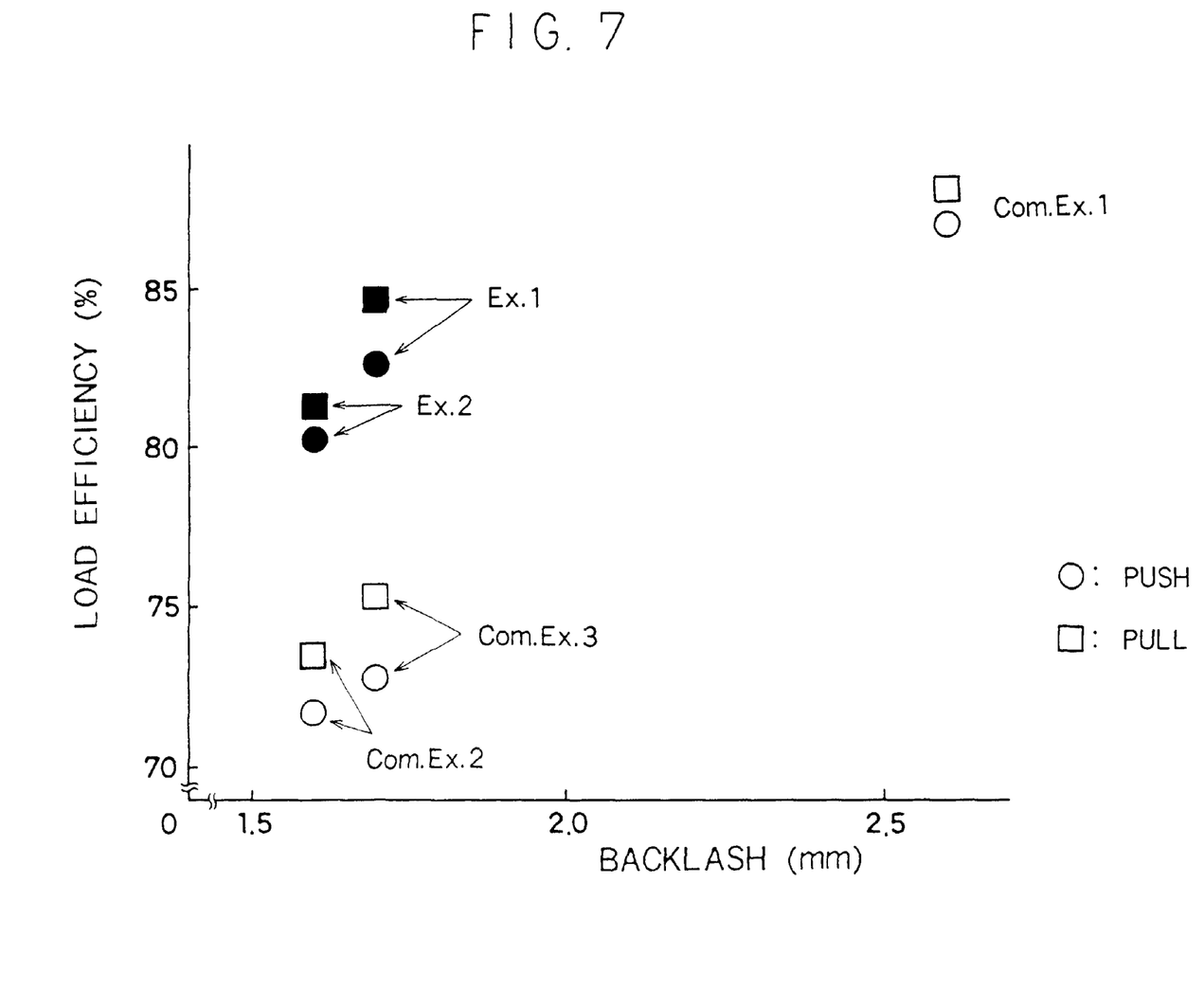
FIG. 7 is a graph showing a relation between load efficiency and backlash.
Figure 8:
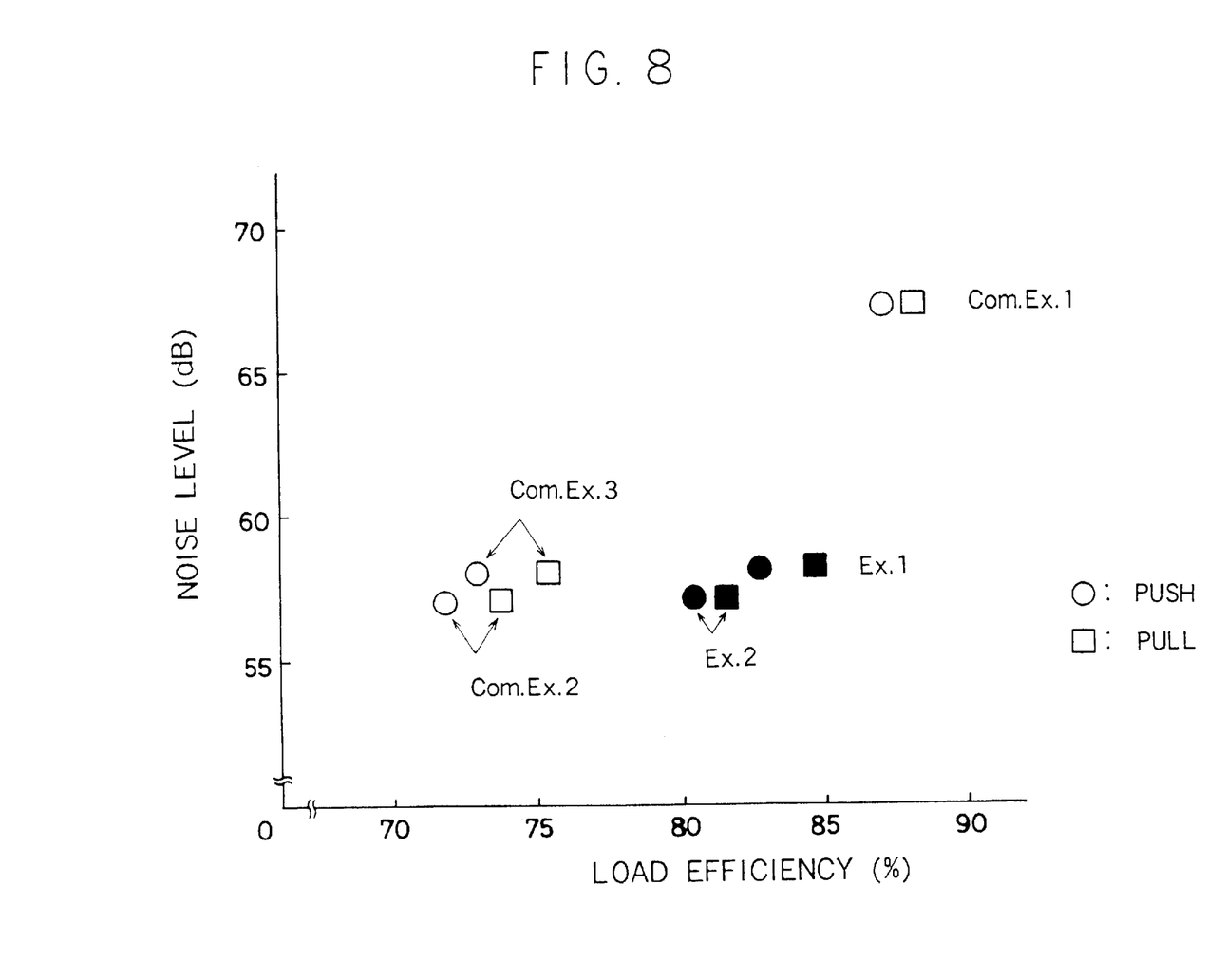
FIG. 8 is a graph showing a relation between noise level and load efficiency.
Figure 10:
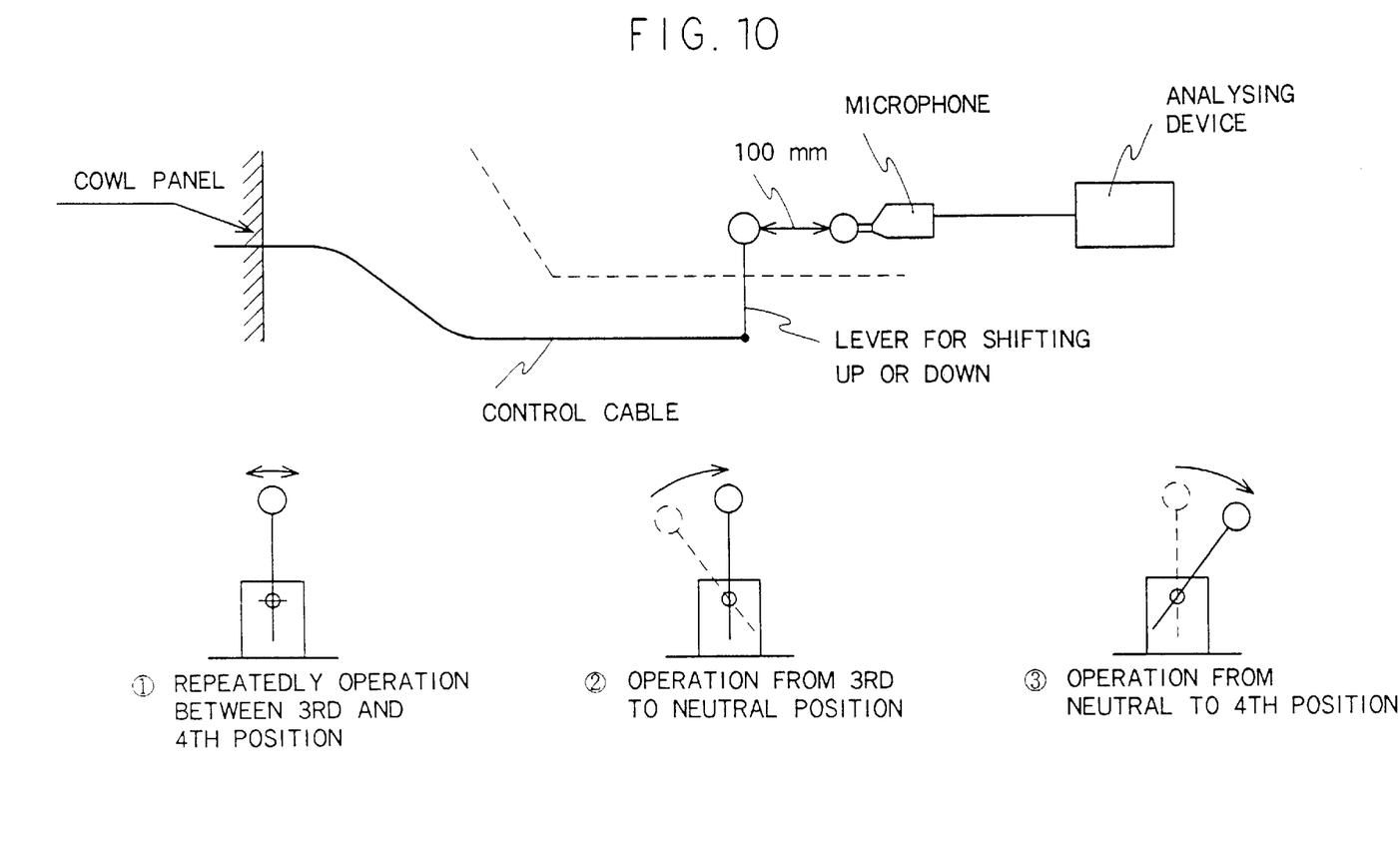
FIG. 10 is an explanatory view showing measuring method of noise.

Noise level is measured by providing the control cable in automobile, and applying shift change operation to the change lever (please see FIG. 10). The result of the measurement of the noise level is shown in Table 1 and FIGS. 7 to 8.

TABLE 1

|  | Ex.1 | Ex.2 | Com. Ex.1 | Com. Ex.2 | Com. Ex.2 |
|---|---|---|---|---|---|
| Load Efficiency (%) | | | | | |
| Push | 82.7 | 80.3 | 87.2 | 71.7 | 72.8 |
| Pull | 84.7 | 81.5 | 88.3 | 73.6 | 75.3 |
| backlash (mm) | 1.7 | 1.6 | 2.6 | 1.6 | 1.7 |
| noise level (dB) | 58 | 57 | 67 | 57 | 58 |
| clearance (mm) | 0.08 | 0.08 | 0.2 | 0.08 | 0.08 |

In accordance with the inner cable of the present invention, in only M (1≦M≦0.3N) piece(s) of strands, there is very small clearance between each of the M piece(s) of strands and inner surface of the conduit. Therefore, there is sufficient clearance between the inner cable and the conduit, so that load efficiency and sliding resitance with no load are not deteriorated. There is very small clearance between each of the M piece(s) of strands and the inner surface of the conduit, so that noise can be prevented from generating by the M piece(s) of strands.

It is to be understood that the invention is not limited in its application to the details of the construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

What is claimed is:

1. An inner cable for a push-pull control cable comprising a core and N pieces of strands, wherein N is an integer ≧4, spirally wound together in one layer around said core in such a manner as to form a spiral winding of said N pieces, wherein a diameter of said core is larger than a diameter of each of said N pieces of strands, wherein said N pieces of strands include at least one M piece thereof, wherein each diameter of said at least one M piece of said N pieces of strands is larger than each diameter of the remaining (N-M) pieces of strands of said N pieces of strands, said at least one M piece serving as a spirally formed protrusion over an outer surface of said spiral winding of the inner cable, wherein (N and) M is an integer satisfying the following relation:

1≦M≦0.3N, and wherein each diameter of said at least one M piece of said N pieces of strands is equal to each other and each diameter of said remaining (N-M) pieces of strands is equal to each other.

2. The inner cable of claim 1, wherein M is 1.

3. The inner cable of claim 2, wherein a difference between a maximum finished diameter of the inner cable is defined by said at least one M piece of said N pieces of said strands and minimum finished diameter of the inner cable defined by said remaining (N-M) pieces of strands is in a range of 2 to 10% of the minimum finished diameter.

4. The inner cable of claim 2, wherein each of N pieces of strands is composed of a plurality of wires.

5. The inner cable of claim 2, wherein N is in the range of 7 to 10.

6. The inner cable of claim 1, wherein a difference between a maximum finished diameter of the inner cable is defined by said at least one M piece of said N pieces of said strands and minimum finished diameter of the inner cable defined by said remaining (N-M) pieces of strands is in a range of 2 to 10% of the minimum finished diameter.

7. The inner cable of claim 6, wherein each of N pieces of strands is composed of a plurality of wires.

8. The inner cable of claim 6, wherein N is in the range of 7 to 10.

9. The inner cable of claim 1, wherein each of N pieces of strands is composed of a plurality of wires.

10. The inner cable of claim 1, wherein N is in range of 7 to 10.

11. The inner cable of claim 9, wherein said spiral winding has an ordinary lay construction in which each of the plurality of wires of the N pieces of strands are laid in one direction and the N pieces of strands of the inner cable are laid in the opposite direction.

* * * * *